(12) United States Patent
Cox et al.

(10) Patent No.: US 12,307,438 B2
(45) Date of Patent: May 20, 2025

(54) COLLECTOR CONTAINER FOR NON-FUNGIBLE TOKEN (NFT) ASSETS

(71) Applicant: Disney Enterprises, Inc., Burbank, CA (US)

(72) Inventors: Jason Alexander Cox, Valencia, CA (US); Ishag Alexanian, Northridge, CA (US); Brian Lawrence Scott, Burbank, CA (US); Justice M. London, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 2 days.

(21) Appl. No.: 17/686,114

(22) Filed: Mar. 3, 2022

(65) Prior Publication Data

US 2022/0383295 A1  Dec. 1, 2022

Related U.S. Application Data

(60) Provisional application No. 63/193,275, filed on May 26, 2021.

(51) Int. Cl.
*G06Q 20/36* (2012.01)
*G06Q 20/12* (2012.01)
*G06Q 20/32* (2012.01)
*G06Q 20/38* (2012.01)
(Continued)

(52) U.S. Cl.
CPC ....... *G06Q 20/367* (2013.01); *G06Q 20/1235* (2013.01); *G06Q 20/3278* (2013.01); *G06Q 20/38215* (2013.01); *H04L 9/3213* (2013.01); *G06Q 2220/00* (2013.01); *H04L 9/50* (2022.05); *H04L 2209/80* (2013.01)

(58) Field of Classification Search
None
See application file for complete search history.

(56) References Cited

U.S. PATENT DOCUMENTS

| 6,959,390 | B1 * | 10/2005 | Challener | H04L 9/0894 |
| | | | | 380/282 |
| 10,505,726 | B1 * | 12/2019 | Andon | G06Q 30/016 |
| 11,075,891 | B1 * | 7/2021 | Long | H04L 9/3213 |

(Continued)

FOREIGN PATENT DOCUMENTS

| KR | 20200046260 A | * | 10/2018 | .......... G06Q 30/018 |
| WO | WO-2017213937 A1 | * | 12/2017 | ............ G06F 3/016 |
| WO | WO-2022245595 A1 | * | 11/2022 | |

OTHER PUBLICATIONS

R. White, "How Computers Work," Seventh edition, published Oct. 15, 2003, 2003, p. 12 (Year: 2003).*

(Continued)

*Primary Examiner* — Eduardo Castilho
(74) *Attorney, Agent, or Firm* — Farjami & Farjami LLP

(57) ABSTRACT

According to one exemplary implementation, a collector container includes processing hardware, an output device controlled by the processing hardware; and a memory storing a digital wallet. The collector container is configured to uniquely store a non-fungible token (NFT) in the digital wallet, the NFT certifying ownership of an NFT asset. The collector container is further configured to store the NFT asset in the memory, and to display the NFT asset using the output device.

17 Claims, 5 Drawing Sheets

(51) Int. Cl.
*H04L 9/00* (2022.01)
*H04L 9/32* (2006.01)

(56) References Cited

U.S. PATENT DOCUMENTS

| | | | | |
|---|---|---|---|---|
| 11,182,467 | B1* | 11/2021 | Medina | G06F 21/36 |
| 11,227,010 | B1* | 1/2022 | Vieira De Souza ... | G06Q 30/02 |
| 11,250,399 | B2* | 2/2022 | Knock | G06Q 20/0658 |
| 2002/0048369 | A1* | 4/2002 | Ginter | G06Q 20/24 |
| | | | | 380/246 |
| 2008/0102910 | A1* | 5/2008 | Peppel | G06Q 30/02 |
| | | | | 463/1 |
| 2015/0111623 | A1* | 4/2015 | Hegemier | B44C 1/105 |
| | | | | 455/575.1 |
| 2016/0300234 | A1* | 10/2016 | Moss-Pultz | G06Q 20/3825 |
| 2017/0083713 | A1* | 3/2017 | Simmons | G06F 21/6209 |
| 2017/0330174 | A1* | 11/2017 | Demarinis | G06Q 40/04 |
| 2018/0246895 | A1* | 8/2018 | Kass | G06F 16/5838 |
| 2019/0366475 | A1* | 12/2019 | Scarselli | G06Q 30/018 |
| 2020/0005284 | A1* | 1/2020 | Vijayan | G06Q 20/02 |
| 2020/0177579 | A1* | 6/2020 | Allen | G06F 21/64 |
| 2020/0242105 | A1* | 7/2020 | Rich | G06F 16/27 |
| 2020/0272713 | A1* | 8/2020 | Black | G06Q 30/06 |
| 2021/0243027 | A1* | 8/2021 | Gupta | G06F 21/32 |
| 2021/0248594 | A1* | 8/2021 | Yantis | G06Q 20/405 |
| 2021/0279305 | A1* | 9/2021 | Goldston | G06Q 20/389 |
| 2021/0279695 | A1* | 9/2021 | Rice | G06Q 20/405 |
| 2021/0287195 | A1* | 9/2021 | Prakash | G06Q 20/123 |
| 2021/0304197 | A1* | 9/2021 | Pomassl | G06Q 20/3223 |
| 2021/0390531 | A1* | 12/2021 | Voorhees | G06Q 20/367 |
| 2022/0114567 | A1* | 4/2022 | Knock | G06Q 20/3678 |
| 2022/0122050 | A1* | 4/2022 | Pacella | G06Q 20/065 |
| 2022/0188839 | A1* | 6/2022 | Andon | G06Q 20/02 |
| 2022/0230175 | A1* | 7/2022 | Haruna | G06Q 20/389 |
| 2022/0240062 | A1* | 7/2022 | Gurayah | H04W 12/02 |
| 2022/0309491 | A1* | 9/2022 | Shapiro | G06Q 20/3674 |
| 2022/0329446 | A1* | 10/2022 | Jackson | H04L 9/3247 |
| 2022/0337392 | A1* | 10/2022 | Schauer | H04L 9/3247 |
| 2023/0053969 | A1* | 2/2023 | Sutton-Shearer | G06Q 20/363 |
| 2023/0186281 | A1* | 6/2023 | Todasco | G06Q 20/384 |
| | | | | 705/64 |
| 2023/0409679 | A1* | 12/2023 | Rubin | G06F 21/1014 |
| 2024/0193567 | A1* | 6/2024 | Bettati | G06Q 20/123 |

OTHER PUBLICATIONS

J. Arcenegui, R. Arjona R, R. Román and I. Baturone, "Secure Combination of IoT and Blockchain by Physically Binding IoT Devices to Smart Non-Fungible Tokens Using PUFs," Sensors (Basel), Apr. 30, 2021;21(9):3119; doi: 10.3390/s21093119. PMID: 33946227; PMCID: PMC8125170. (Year: 2021).*

Tokenframe.com, "TokenFrame NFT display," retrieved on May 20, 2021 from https://web.archive.org/web/20210520222921/https://tokenframe.com/ , 2021, (Year: 2021).*

Q. Wang, R. Li, Q. Wang, and S. Chen, "Non-Fungible Token (NFT): Overview, Evaluation, Opportunities and Challenges," arXiv [cs.CR], 2021, retrieved from https://arxiv.org/abs/2105.07447. (Year: 2021).*

M. Franceschet et al., "Crypto art: A decentralized view," arXiv [cs.CY], 2019, retrieved from https://arxiv.org/abs/1906.03263 (Year: 2019).* theverge.com, "The NBA on NFT: Top Shot is playing the long game in the NFT craze," retrieved from https://web.archive.org/web/20210507142411/https://www.theverge.com/22348858/nba-nft-top-shot-dapper-labs, May 30, 2021 (Year: 2021).*

"How to Display Your NFT Collection" Kapwing Resources Sep. 24, 2021 pp. 1-27 https://www.kapwing.com/resources/how-to-display-your-nft-crypto-art-collection/.

* cited by examiner

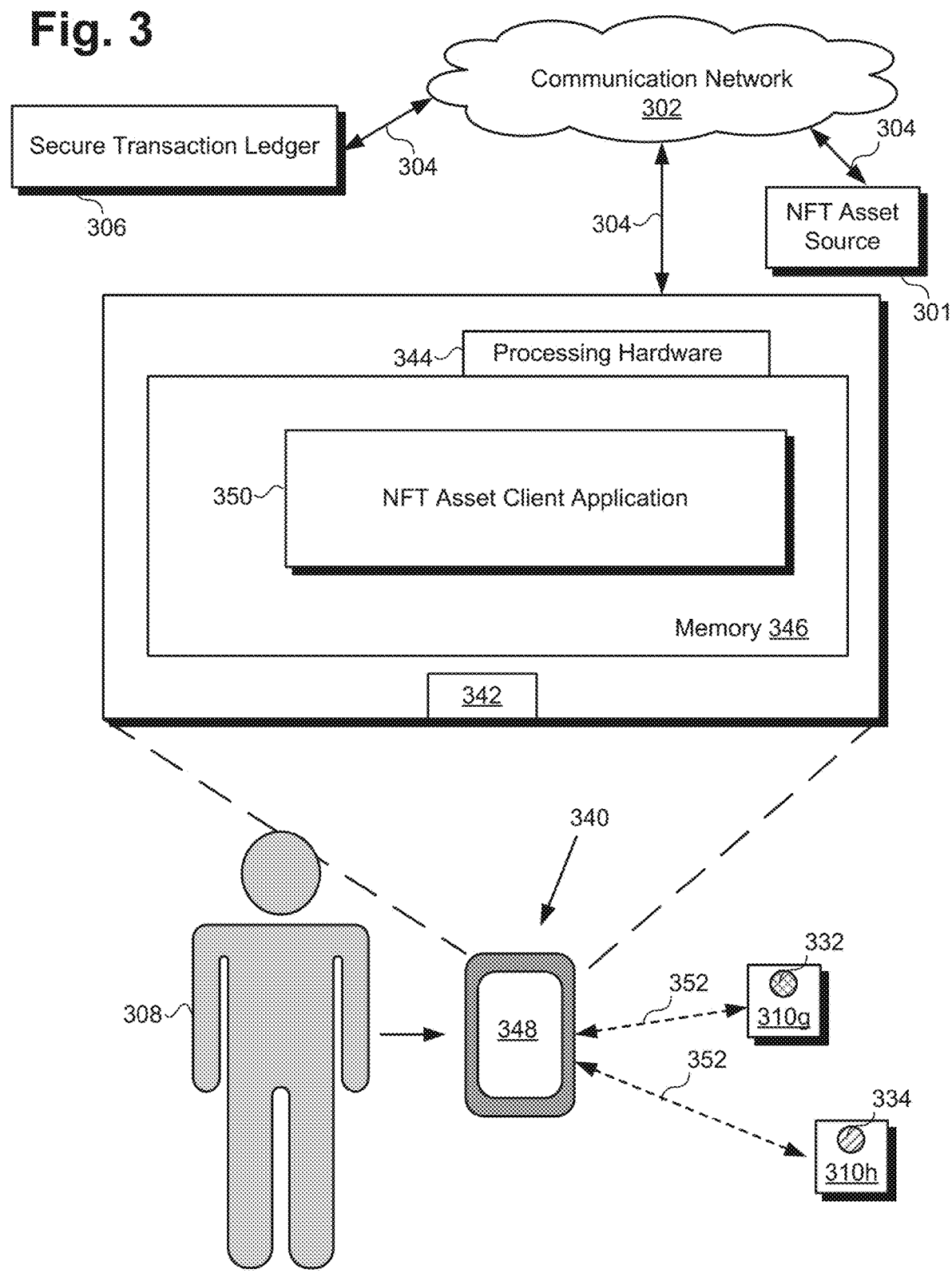

US 12,307,438 B2

COLLECTOR CONTAINER FOR NON-FUNGIBLE TOKEN (NFT) ASSETS

RELATED APPLICATIONS

The present application claims the benefit of and priority to a Provisional Patent Application Ser. No. 63/193,275 filed on May 26, 2021, and titled "Collector Container for NFT Asset Display and Reassignment," which is hereby incorporated fully by reference into the present application.

BACKGROUND

The technology known as a non-fungible token (NFT) enables individual artists and companies to sell ownership rights to a digital asset, such as a file containing a photo or other image, video, audio, or any other desirable digital representation. The owner of an NFT and its associated asset can access the asset via the cloud, to display to others as part of a personal gallery, or both. However, despite the pride of ownership of a digital asset that owning an NFT may provide, NFT owners at present lack any way of physically engaging with or physically possessing that digital asset.

BRIEF DESCRIPTION OF THE DRAWINGS

FIG. 3 shows a personal communication device configured to mediate transfer of ownership of NFT assets and their associated NFTs, according to one implementation;

DETAILED DESCRIPTION

Figure 1A:
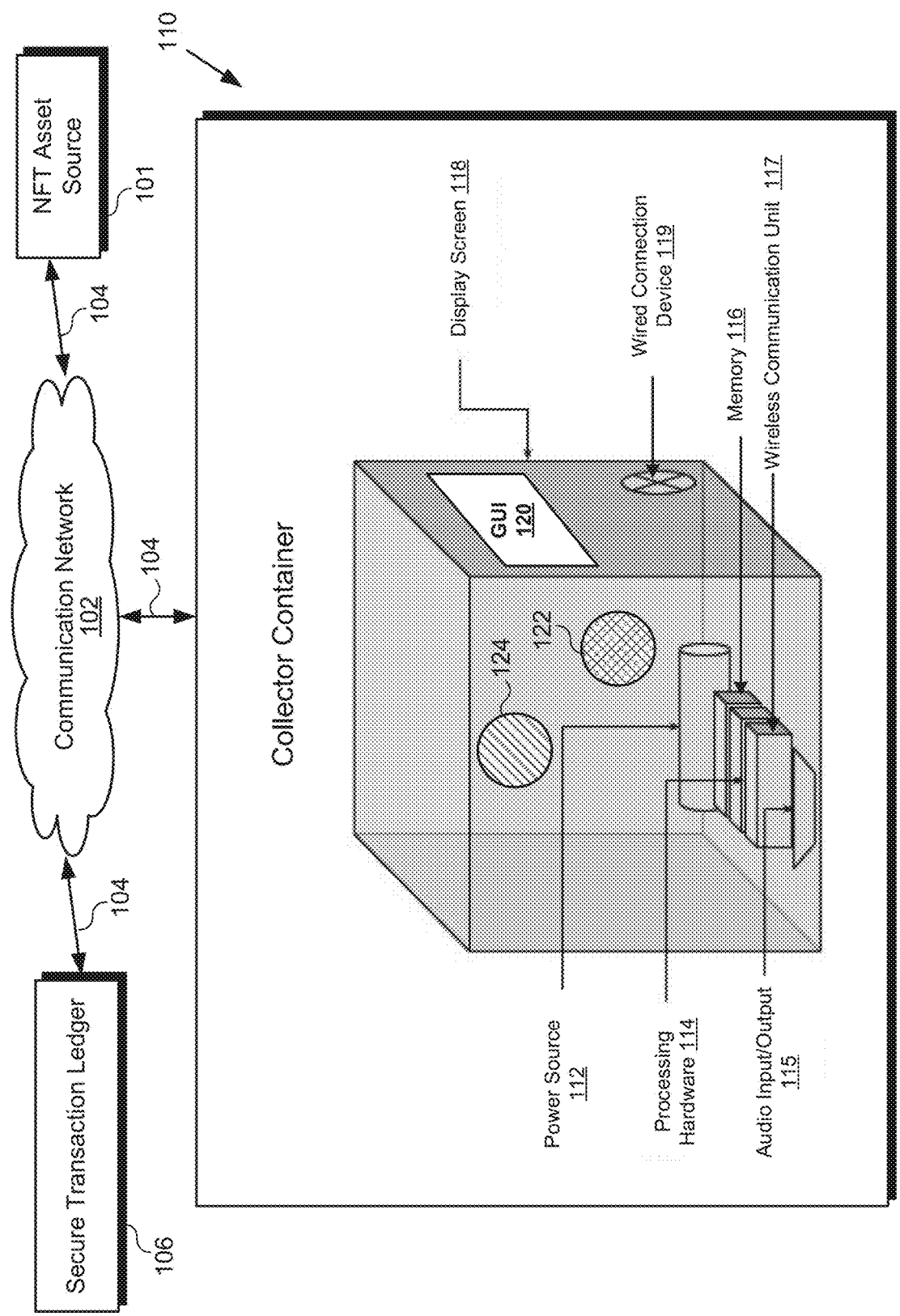
FIG. 1A shows a diagram of an exemplary collector container for non-fungible tokens (NFTs) and their associated NFT assets, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, the technology known as a non-fungible token (NFT) enables individual artists and companies to sell ownership rights to a digital asset, such as a file containing a photo or other image, video, audio, or any other desirable digital representation. An NFT is a unit of data stored on a secure digital ledger, which certifies a digital asset to be unique and therefore not interchangeable. However and as also noted above, despite the pride of ownership of a digital asset that owning an NFT may provide, NFT owners presently lack any way of physically engaging with or physically possessing that digital asset.

The present application discloses collector container devices configured to store and display NFT assets, as well as to uniquely store the NFTs certifying ownership of the NFT assets. It is noted that, as defined in the present application, the expressions "uniquely store," and "uniquely stored." as used to characterize an NFT, refers to an NFT that resides exclusively in, and is identified exclusively with, a single collector container at a time. In addition, the term "collector container" may refer to any physical device that stores a copy of an NFT asset, uniquely stores NFT credentials (e.g., public and private keys certifying ownership of the NFT asset), and enables someone who possesses the collector container to display or otherwise experience the NFT asset, as well as to reassign, i.e., transfer ownership of the NFT asset to another person or entity. In various implementations, a collector container may take the form of a tabletop or shelf top display (e.g., a cube or other object), a wall mounted plaque, a frame, or a wearable device such as a button, pin, or watch, for example.

It is further noted that, as defined in the present application, the term "NFT asset" may refer to any digital asset having its ownership certified by an NFT. Examples of an NFT asset may include a digital file containing an image or images, video without audio, audio without video, or audio-video (AV) content, such as all or part of a television (TV) episode, movie, or video game, to name a few. Moreover, as defined in the present application, the verb "display" refers to providing any visual, audio, or multi-media presentation of an NFT asset. Thus, displaying an NFT asset may include showing an image of the NFT asset, providing a background for the NFT asset, generating a light show for the NFT asset, and providing audio output in the form of speech, music, or other sounds, to name a few examples.

It is also noted that the relationship between an NFT asset and a collector container is many-to-one, rather than one-to-one. That is to say, in some implementations, the same collector container may store a plurality of NFT assets and uniquely store respective NFTs for each of those NFT assets. However, a particular instantiation of an NFT asset and its associated NFT are uniquely present on only one collector container at a time. Thus, according to the present novel and inventive principles, physical possession of a collector container confers ownership of any NFT asset or assets stored in that collector container.

FIG. 1A shows a diagram of exemplary collector container 110 for non-fungible tokens (NFTs) and their associated NFT assets, according to one implementation. As shown in FIG. 1A, collector container 110 includes power source 112, processing hardware 114, audio input/output devices 115, memory 116 implemented as a computer-readable non-transitory storage medium, wireless communication unit 117, and display screen 118 providing graphical user interface (GUI) 120. In addition, in some implementations, collector container 110 may include optional wired connection device 119, which may be configured to interactively couple collector container 110 to another collector container or other device via a wired connection. According to the present exemplary implementation, collector container 110 stores two NFT assets, i.e., NFT asset 122 and NFT asset 124. Also shown in FIG. 1A are communication network 102 and network communication links 104 communicatively coupling collector container 110 to NFT asset source 101 and to cloud-based or distributed secure transaction ledger 106.

Although collector container 110 is shown as a cube type object in FIG. 1A, that representation is provided merely by way of example. As noted above, in other implementations, collector container 110 may be a tabletop or shelf top object having any shape or silhouette (e.g., the silhouette of an animated character, a building such as a castle, a letter, a word, a logo, etc.), a wall plaque, a frame, or a wearable device such as a button, pin, or watch, for example. That is to say, a collector container 110 may be portable, or even wearable.

Moreover, in some implementations, collector container 110 may provide a background or design to enhance display of NFT assets 122 and 124. For example, in implementations in which collector container 110 takes the form of a button or pin, display screen 118 may be surrounded by an underwater scene, a jungle scene, an outer space scene, or any other environmental representation relevant to the particular NFT asset being displayed. Furthermore, in some implementations, collector container 110 may be configured such that the shape of collector container 110 corresponds to an appearance of the NFT asset. By way of example, where NFT assets 122 and 124 are digital images of a prince and princess, collector container 110 may have the shape or appearance of a castle.

It is noted that although FIG. 1A depicts collector container 110 as storing two NFT assets 122 and 124, that representation is also merely an example. In various use cases, collector container 110 may not store any NFT asset, i.e., collector container 110 may be empty, collector container 110 may store one of NFT assets 122 or 124, or collector container 110 may store more than two NFT assets. It is further noted that, in some implementations, collector container 110 may be configured to display a plurality of NFT assets concurrently. For example, where NFT asset 122 is an audio file and NFT asset 124 is an image, audio file NFT asset 122 may be played by audio input/output devices 115 while NFT asset image 124 is displayed on display screen 118. Thus, in various implementations, collector container 110 may include one or more output devices controlled by processing hardware 114, such as one or more audio speakers included among audio input/output devices 115, display screen 118, or one or more audio speakers and display screen 118.

In addition, it is noted that although FIG. 1A shows collector container 110 to include single wired connection device 119, in some other implementations, collector container 110 may include a plurality of wired connection devices 119, which may be located on one or more adjacent or opposite sides, or on any other suitable surface of collector container 110.

Power source 112 may take the form of a rechargeable battery to enable substantially uninterrupted power for collector container 110. Processing hardware 114 may include a plurality of hardware processing units, such as one or more central processing units, one or more graphics processing units, and one or more application-specific integrated circuit for example. In one implementation, processing hardware 114 may take the form of a system-on-chip (SoC) microcontroller, for example. By way of definition, as used in the present application, the terms "central processing unit" (CPU), "graphics processing unit" (GPU), and tensor processing unit (TPU) have their customary meaning in the art. That is to say, a CPU includes an Arithmetic Logic Unit (ALU) for carrying out the arithmetic and logical operations, as well as a Control Unit (CU) for retrieving instructions from memory 116, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

Memory 116 may take the form of any computer-readable non-transitory storage medium. The expression "computer-readable non-transitory storage medium," as defined in the present application, refers to any medium, excluding a carrier wave or other transitory signal that provides instructions to processing hardware 114 of collector container 110. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Audio input/output devices 115 of collector container may include one or more microphones for receiving voice commands from a user, as well one or more audio speakers for providing audio output. Wireless communication unit 117 may be configured for use with one or more of a variety of wireless communication protocols. For example, wireless communication unit 117 may be implemented as a fourth generation (4G) wireless transceiver, or as a 5G wireless transceiver. In addition, or alternatively, wireless communication unit 117 may include a Near Field Communication (NFC) device and/or may be configured for communications using one or more of WiFi, Bluetooth, ZigBee, and 60 GHz wireless communications methods.

Display screen 118 may be implemented as a high-definition (HD) display screen, such as a 1080p or 1080i display screen, for example, or as a 4K or 8K ultra-HD (UHD) display screen. Display screen 118 may take the form of a liquid crystal display (LCD) screen, light-emitting diode (LED) display screen, organic light-emitting diode (OLED) display screen, quantum dot (QD) display screen, or any other suitable display screen that perform a physical transformation of signals to light. Moreover, in some implementations, display screen 118 may be a touchscreen display providing GUI 120 and configured to respond to input touches and gestures by a user of collector container 110. With respect to GUI 120, it is noted that GUI 120 allows a user of collector container 110 to scroll through a library or list of NFT assets stored on collector container 110 to select any one or more of them for display by display screen 118, audio speakers included among audio input/output devices 115, or any combination thereof. It is noted that, in some implementations, selection of an NFT asset for display by collector container 110 may be performed manually by a user of collector container 110 by pressing a button, providing a touchscreen, uttering a voice command, or selecting the NFT asset via a user application, to name a few examples.

NFT asset source 101 may be a creator of NFT assets, a creator and warehouse of NFT assets, a distributor or warehouse of NFT assets created by others, or a distributor or producer and distributor of collector containers including NFT assets. Alternatively, and as described below by reference to FIGS. 2 and 3, in some use cases, a collector container or personal communication device can serve as the source of an NFT asset. Communication network 102 may be a packet-switched network such as the Internet, for example. Alternatively, communication network 102 may be a private wide area network (WAN), local area network (LAN), or another type of limited distribution or private network. Secure transaction ledger 106 may take the form of a public or private secure transaction ledger. Examples of such secure transaction ledgers may include Blockchain, Hashgraph. Directed Acyclic Graph (DAG), and Holochain ledgers, to name a few. In use cases in which secure transaction ledger 106 is a blockchain ledger, it may be advantageous or desirable to implement secure transaction ledger 106 to utilize a consensus mechanism having a proof-of-stake (PoS) protocol, rather than the more energy intensive proof-of-work (PoW) protocol.

Collector container 110 advantageously offers its user a novel and unique opportunity to own and physically display a digital collectable. Using NFT technology and secure transaction ledger 106, collector container 110 can be used to certify the authenticity of the digital collectable, as well as to validate its ownership. According to the exemplary implementation shown in FIG. 1A, collector container 110 is configured to access NFT asset source 101 to obtain NFT assets, or to access secure transaction ledger 106 to exchange NFTs and their associated NFT assets with owners of other collector containers. In some implementations, collector container 110 may be purchased preloaded with one or more NFTs and their associated NFT assets, while in other implementations, collector container may be purchased empty, and may be loaded by its user, as described below by reference to FIGS. 2 and 3.

Once loaded, or when acquired as a preloaded device, collector container 110 enables its owner to immediately enjoy the NFT and display the NFT asset. Once the NFT asset is loaded on collector container 110 the associated NFT is bound to that physical device. It is noted that any NFT can only be owned by one collector container 110 and collector container 110 is secure from hacking (i.e., it is encrypted and securely holds public and private keys). The value of NFT assets may be protected by NFT asset source 101 by ensuring their scarcity. That is to say, only a limited number of NFTs may be created for any one digital asset.

By way of example, a process for production and distribution of an NFT asset to collector container is described below. It is noted that the described process is directed to one implementation in which NFT asset source 101 is a warehouse of digital assets and collector container is sold preloaded with an NFT and its associated NFT asset. As noted above, in some use cases collector container 110 may be sold as an empty container.

Once a digital asset has been selected to be an NFT asset, an NFT may be generated, e.g., minted, by NFT asset source 101 from the selected digital asset, the NFT including a permalink Uniform Resource Locator (URL) or other Uniform Resource Identifier (URI) for the NFT asset. The NFT may then be recorded on secure transaction ledger 106 as being owned by NFT asset source 101 with a permalink URL or URI for the NFT asset. Collector container 110 may be manufactured and assigned unique identifiers, e.g., private and public keys. It is noted that in some implementations, collector container 110 may be stamped, such as on a bottom or back surface of collector container 110 with a Quick Response (QR) code including the public key of the collector container 110. Ownership of the NFT is then transferred from NFT asset source 101 to collector container 110 where it is uniquely stored in a digital wallet, and that transfer is recorded on secure transaction ledger 106.

Collector container 110 may be configured to synchronize with secure transaction ledger 106, via communication network 102 for example, to determine its associated NFT, and accesses the NFT asset via the permalink URL or URI to store a local copy of the NFT asset in memory 116. A customer (hereinafter "user") who purchases or otherwise obtains collector container 110 can then immediately enjoy holding the NFT ownership and displaying the NFT asset using an audio output device included among audio input/output devices 115, display screen 118, or an audio output device and display screen 118.

It is emphasized that collector container 110 can only display NFT assets associated with NFTs that are uniquely stored in it. If collector container 110 is lost, the uniquely stored NFT is lost and cannot be recovered. Moreover, if another user recovers lost collector container 110 that other user is able to enjoy the NFT on collector container 110 to transfer the NFT to another collector container, or to transfer the NFT to a third party. In other words, ownership of the NFT transferred to collector container 110 passes with physical possession of collector container 110. Thus, collector container 110 can be traded or sold as physical items and its associated NFT is traded or sold along with it. As noted above, a single collector container can hold a plurality of NFTs concurrently, and may display any one or all of the NFT assets associated with those held NFTs. In some implementations, when collector container is empty, display screen 118 may read "blank" or "empty."

Figure 1B:
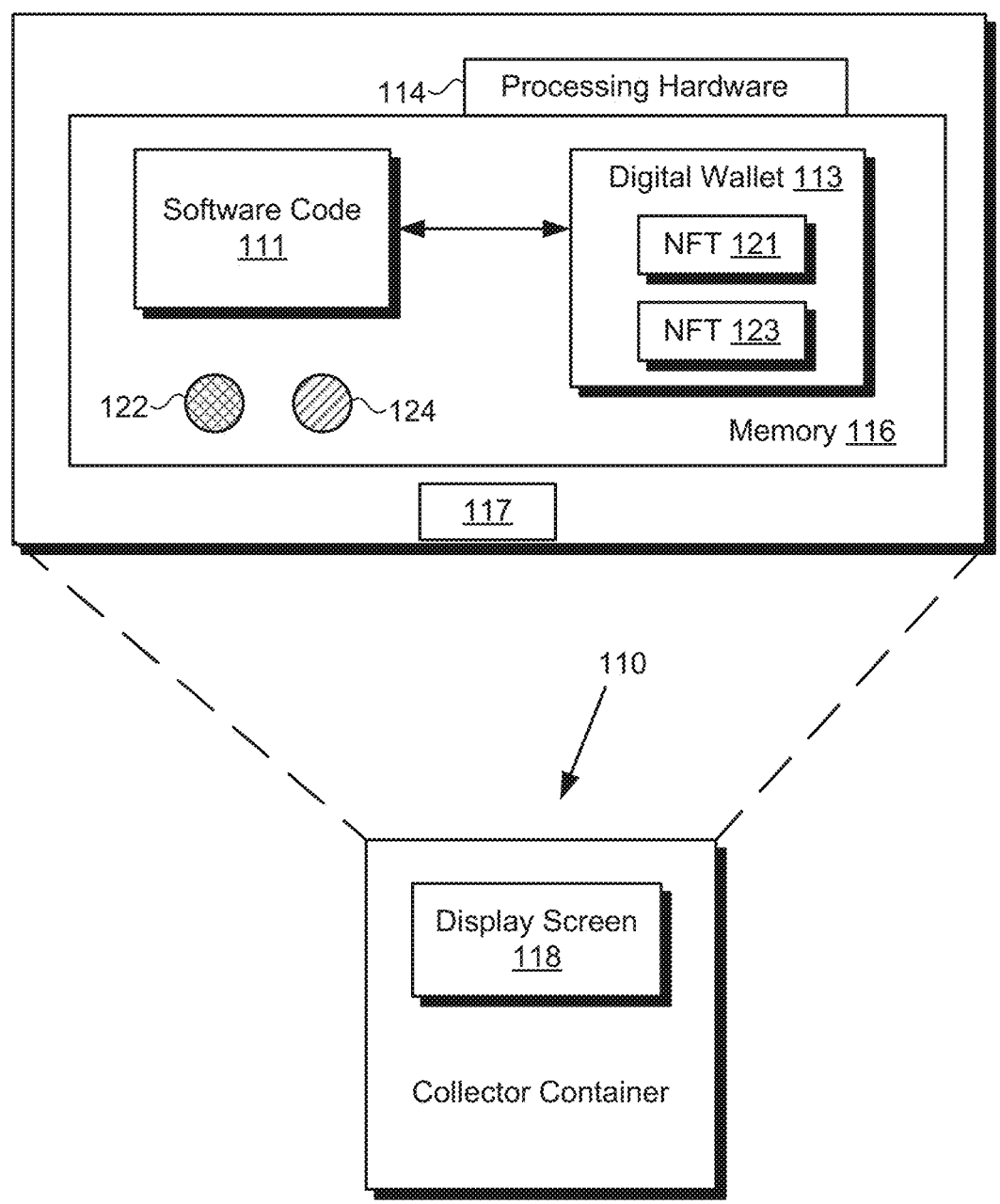
FIG. 1B shows a different exemplary perspective of a collector container for NFTs and their associated NFT assets, according to one implementation.

FIG. 1B shows a different exemplary perspective of collector container 110 for NFTs and their associated NFT assets, according to one implementation. As shown in FIG. 1B, collector container 110 includes processing hardware 114, memory 116, wireless communication unit 117, and display screen 118. In addition, memory 116 of collector container 110 is shown to store software code 111, digital wallet 113, and NFT assets 122 and 124. As further shown in FIG. 1B, digital wallet 113 of collector container 110 uniquely stores NFTs 121 and 123 certifying ownership of respective NFT assets 122 and 124. That is to say. NFTs 121 and 123 certifying ownership of respective NFT assets 122 and 124 reside exclusively within collector container 110.

It is noted that any feature in FIG. 1B identified by a reference number identical to that shown in FIG. 1A corresponds in general to that previously identified feature, and those corresponding features may share any of the characteristics attributed to either corresponding feature by the present disclosure. Thus, collector container 100, processing hardware 114, memory 116, wireless communication unit 117, display screen 118, and NFT assets 122 and 124, in FIG. 1B, correspond respectively in general to those same features in FIG. 1A, and vice versa. Moreover, although not shown in FIG. 1A, collector container 110 may include features corresponding respectively to software code 111 and digital wallet 113 uniquely storing NFTs 121 and 123.

Thus, as shown and described by reference to FIGS. 1A and 1B, collector container 110 includes processing hardware 114, an output device in the form of one or more of display screen 118 and audio speakers included among audio input/output devices 115 that is/are controlled by processing hardware 114, and memory 116 storing digital wallet 113.

In some use cases, as noted above, collector container 110 may be empty when obtained by a user. i.e., absent NFTs 121 and 123 and their respective associated NFT assets 122 and 124. Nevertheless, collector container 110 is configured to uniquely store one or more of NFTs 121 and 123 in digital wallet 113, where NFTs 121 and 123 certify ownership of respective NFT assets 122 and 124, to store one or more of NFT assets 122 and 124 in memory 116, and to display one or more NFT assets 122 and 124 using the output devices of collector container 110.

However, in other use cases, a user of collector container 110 may receive collector container 110 preloaded with one or more of NFTs 121 and 123 and one or more of respective NFT assets 122 and 124. That is to say, in some use cases, collector container 110 may also include one or more of NFT assets 122 and 124 stored in memory 116, and one or more of respective NFTs 121 and 123 uniquely stored in digital wallet 113.

With respect to software code 111, it is noted that in use cases in which collector container 110 is empty when obtained by a user, processing hardware 114 may be configured to execute software code 111 to obtain, using wireless communication unit 117 or wired connection device 119, one or more of NFTs 121 and 123 certifying ownership of one or more respective NFT assets 122 and 124, and to receive, based on obtaining one or more of NFTs 121 and 123, one or more of respective NFT assets 122 and 124. Moreover, processing hardware 114 may also be configured to execute software code 111 to uniquely store one or more of NFTs 121 and 123 in digital wallet 113, store one or more of respective NFT assets 122 and 124 in memory 116, and display one or more of NFT assets 122 and 124 using the output device or devices of collector container 110.

In some implementations, processing hardware 114 may be further configured to execute software code 111 to pair, using wireless communication unit 117 or wired connection device 119, collector container 110 with one or more other collector containers, and to synchronize, using the pairing, display of one or more of NFT assets 122 and 124 with the one or more other collector containers. Alternatively, in implementations in which collector container 110 includes wired connection device 119 configured to interactively couple collector container 110 to another collector container, processing hardware 114 may be further configured to execute software code 111 to synchronize display of one or more of NFT assets 122 and 124 with that other collector container, using wired connection device 119.

According to some implementations, processing hardware 114 may be yet further configured to execute software code 11 to transfer, using wireless communication unit 117 or wired connection device 119, ownership of one or more of NFTs 121 and 123 to another digital wallet stored in another collector container, to relinquish one or more of respective NFT assets 122 and 124 to that other collector container, and to record the transfer of the one or more NFTs in secure transaction ledger 106. For example, processing hardware 114 may execute software code 111 to utilize an NFC device of wireless communication unit 117 to transfer the one or more NFTs, relinquish the one or more NFT assets, and record the transfer of the one or more NFTs in secure transaction ledger 106.

Figure 2:
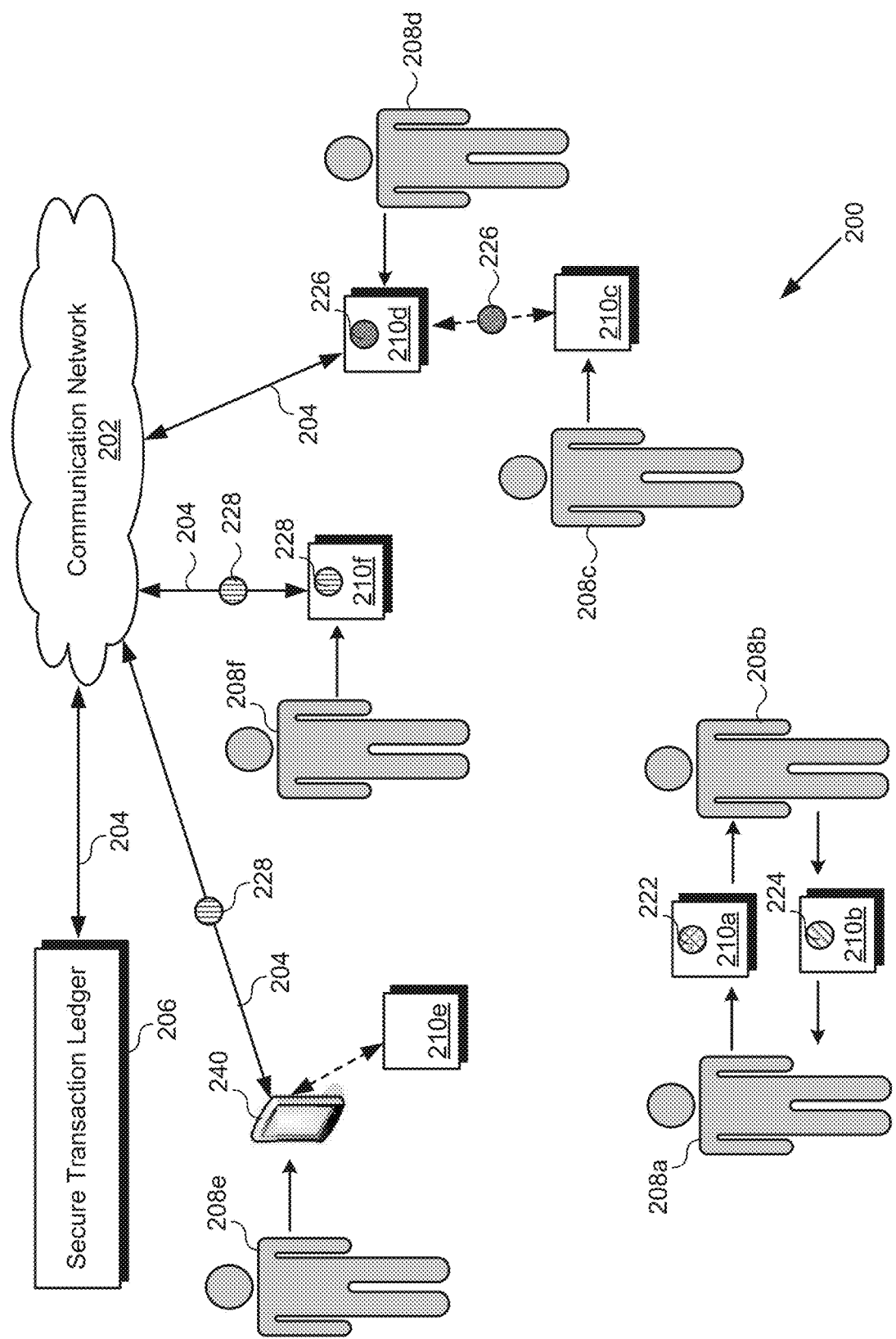
FIG. 2 shows a diagram illustrating a variety of different ways that a collector container can be used to transfer ownership of an NFT, according to one implementation.

FIG. 2 shows diagram 200 of a variety of different ways that a collector container can be used to transfer ownership of an NFT, according some exemplary use cases. Diagram 200 depicts users 208a. 208b. 208c, 208d. 208e, and 208f of respective collector containers 210a, 210b, 210c, 210d, 210e, and 210f (hereinafter "collector containers 210a-210f"). Also shown in FIG. 2 are communication network 202, network communication links 204, secure transaction ledger 206, and personal communication device 240 of user 208e, as well as NFT assets 222, 224, 226, and 228.

Communication network 202, network communication links 204, and secure transaction ledger 206 correspond respectively in general to communication network 102, network communication links 104, and secure transaction ledger 106, in FIG. 1A. Thus, communication network 202, network communication links 204, and secure transaction ledger 206 may share any of the characteristics attributed to respective communication network 102, network communication links 104, and secure transaction ledger 106 by the present disclosure, and vice versa.

Each of collector containers 210a-210f, in FIG. 2, corresponds in general to collector container 110, in FIGS. 1A and 1B. As a result, each of collector containers 210a-210f may share any of the characteristics attributed to corresponding collector container 110 by the present disclosure, and vice versa. NFT assets 222 and 224, in FIG. 2, correspond respectively in general to NFT assets 122 and 124, in FIGS. 1A and 1B, and those corresponding features may share any of the characteristics attributed to either corresponding feature by the present disclosure. Moreover. NFT assets 226 and 228 may share any of the characteristics attributed to NFT assets 122 and 124 by the present disclosure, and vice versa.

As shown in FIG. 2, according to one use case, users 208a and 208b may trade ownership of NFT assets 222 and 224 and their associated NFTs merely by physically exchanging collector containers 210a and 210b. In other words, user 208a gives collector container 210a having NFT asset 222 and its associated NFT stored thereon to user 208b, and user 208b gives collector container 210b having NFT asset 224 and its associated NFT stored thereon to user 208a. As further shown in FIG. 2, according to another use case, user 208c of collector container 210c may sell or gift NFT asset 226 and its associated NFT to user 208d of collector container 210d by instructing collector container 210c to wirelessly transmit the NFT associated with NFT asset 226 to collector container 210d, or to transfer the NFT associated with NFT asset 226 to collector container 210d using wired connection device 119. Collector container 210c can then record the ownership transfer on secure public ledger 206, resulting in collector container 210c relinquishing NFT asset 226 and ownership of its associated NFT to whoever possesses collector container 210d (e.g., user 208d).

As yet another use case, or in addition, user 208e of collector container 210e can use personal communication device 240, such as a smart device (e.g., smartphone, smart TV. AI driven virtual assistant, etc.), tablet computer, wearable device, laptop, or desktop computer, for example, to act as a middleman to mediate transfer of the NFT associated with NFT asset 228 from collector container 210e to collector container 210f of user 208f, via communication network 202 and network communication links 204. For example, user 208e may utilize personal communication device 240 to communicate with collector container 210e to obtain the public key for the NFT associated with NFT asset 228 and to transmit that NFT public key to collector container 210f. Collector container 210e can then record the ownership transfer on secure public ledger 206, resulting in collector container 210e relinquishing NFT asset 228 and ownership of its associated NFT to whoever possesses collector container 210f (e.g., user 208f).

FIG. 3 shows personal communication device 340 of user 308, configured to mediate transfer of ownership of NFT assets and their associated NFTs, according to one implementation. As shown in FIG. 3, personal communication device 340 includes transceiver 342, processing hardware 344, display 348, memory 346 implemented as a computer-readable non-transitory storage medium storing NFT asset client application 350. Also shown in FIG. 3 are NFT asset source 301, communication network 302, network communication links 304, secure transaction ledger 306, and wireless communication links 352, as well as collector container 310g holding NFT asset 332 and its associated NFT, and collector container 310h holding NFT asset 334 and its associated NFT. In the exemplary implementation shown in FIG. 3, user 308 owns both of collector containers 310g and 310h and the NFTs associated with each of NFT assets 332 and 334.

With respect to NFT asset client application 350, is noted that although NFT asset client application 350 is a communication application with a built in digital wallet, NFT asset client application 350 does not have rights to any NFT presently held by any collector container, or to the NFT asset associated with any such NFT. Nevertheless, NFT asset client application 350 may be configured to communicate with any collector container and to instruct that collector container to transfer NFTs to other wallets or collector containers by initiating a local communication with that collector container. In the interests of NFT asset security, in some implementations, proximity may be required for such a transfer to occur. For example, in some implementations, the collector container presently holding the NFT to be transferred away would have to be held next to or make contact with personal communication device 340 for the NFT transfer to occur. Alternatively, or in addition, authorizing the transfer may require user 308 to confirm, via GUI 120 or audio input/output devices 115 in response to a prompt from the collector container holding the NFT to be transferred away, that the transfer is requested. As yet another alternative, or in addition, user 308 may use personal communication device 340 to scan a unique QR code stamped on a surface of the collector container that is not publicly visible, such as a bottom surface of a tabletop of shelf-top object, or the back surface of a button or pin, in order to authorize transfer of the NFT.

Thus, NFT asset client application 350 may be configured to initiate a secure and authorized communication session with a collector container holding an NFT asset and instruct that collector container to transfer the NFT for that NFT asset to another digital wallet, which may take the form of a digital wallet of another collector container, another communication device based digital wallet, or to itself. In addition, NFT asset client application 350 can receive and store an NFT in its own digital wallet on personal communication device 340, or initiate transfer of an NFT from its own digital wallet to another digital wallet, which may be a digital wallet of a collector container or a digital wallet stored on another personal communication device, for example.

It is further noted that a single user account of user 308 associated with the same user profile and having the same login credentials can be used to keep track of and mediate transfer of NFT assets associated with any collector containers owned by user 308. For instance, the user account can store an inventory of collector containers that user 308 has possession of, but those collector containers would control transfer of any NFTs they presently hold, as described above. By way of example, user 308 may use his/her NFT asset client application user account to initiate transfer of NFT assets 332 and 334 from respective collector containers 310g and 310h to the digital wallet associated with NFT asset client application 350.

Actual transfer of NFT assets 332 and 334 from respective collector containers 310g and 310h to the digital wallet associated with NFT asset client application 350 would then be performed by collector containers 310g and 310h, rather than under the control of NFT asset client application 350.

As noted above that transfer may be performed by each of collector containers 310g and 310h due to their proximity to personal communication device 340, or in response to a manual confirmation process performed by user 308. e.g., responding affirmatively to an NFT transfer prompt from each of collector containers 310g and 310h, or scanning unique QR codes stamped on each of collector containers 310g and 310h.

After transfer, although collector containers 310g and 310h would be empty, NFT asset client application can remember them. If user 308 wishes to transfer one of NFT assets 332 or 334 to either of collector containers 310g or 310h, user 308 may utilize NFT asset client application 350 to control that transfer. That is to say, because the NFT assets 332 and 334 presently reside on personal communication device 340, NFT asset client application 350 has the unilateral authority to authorize and perform the transfer. However, after transfer, the NFT asset transferred to the collector container is no longer under the control of NFT asset client application 350, but will reside in and be controlled by the collector container presently holding it, which can then be sold, traded, or gifted away by user 308.

NFT asset source 301, communication network 302, network communication links 304, and secure transaction ledger 306 correspond respectively in general to NFT asset source 101, communication network 102, network communication links 104, and secure transaction ledger 106, in FIG. 1A. Thus, NFT asset source 301, communication network 302, network communication links 304, and secure transaction ledger 306 may share any of the characteristics attributed to respective NFT asset source 101, communication network 102, network communication links 104, and secure transaction ledger 106 by the present disclosure, and vice versa.

Collector containers 310g and 310h, correspond in general to collector container 110, in FIGS. 1A and 1B, while NFT assets 332 and 334 correspond in general to either of NFT assets 122 and 124 in FIGS. 1A and 1B. As a result, collector containers 310g and 310h, and NFT assets 332 and 334 may share any of the characteristics attributed to collector container 110, and NFT assets 122 and 124 by the present disclosure, and vice versa. Moreover, personal communication device 340, in FIG. 3, corresponds in general to personal communication device 240, in FIG. 2, and those corresponding features may share any of the characteristics attributed to either feature by the present disclosure.

According to the exemplary implementation shown in FIG. 3, in some use cases, collector containers 310g and 310h include a firmware based user registration process to temporarily bind or pair to a local device such as personal communication device 340. During such a temporary pairing. NFT asset client application 350 resident on personal communication device 340 may be executed by processing hardware 344 to create a digital wallet on personal communication device 340, transfer the NFT associated with NFT asset 332, for example, from collector container 310g to the digital wallet on personal communication device 340. NFT asset client application 350 may then transfer the NFT associated with NFT asset 332 from the digital wallet on personal communication device 340 to digital wallet of collector container 310h.

The transfers between personal communication device 340 and collector containers 310g and 310h described above results in collector container 310g being emptied, and the NFTs associated with both of NFT assets 332 and 334 being held by collector container 310h. Those transfers may be performed using wireless communication links 352, which may be Bluetooth communication links or NFC links for example, or using wired connection device 119. As part of the transfer process, NFT asset client application 350 resident on personal communication device 340, or software code 111 resident on collector container 310g, may utilize communication network 302 and network communication links 304 to record the transfer of the NFT associated with NFT asset 332 on secure transaction ledger 306.

In some implementations, processing hardware 114 may execute software code 111 of container collector container 310g to receive, from NFT asset client application 350, data initiating a secure communication link with one of collector container 310h or personal communication device 340. Processing hardware 114 may further execute software code 111 to receive, from NFT asset client application 350, an instruction to transfer the NFT associated with NFT asset 332 and uniquely stored in a digital wallet of collector container 310g to a second digital wallet stored on one of collector container 310h or personal communication device 340. In response to receiving the instruction from NFT asset client application 350, software code 111 may be executed by processing hardware 114 of collector container 310g to transfer the NFT associated with NFT asset 332 to the second digital wallet, relinquish NFT asset 332 to collector container 310h or personal communication device 340 on which the second digital wallet is stored, and record the transfer of the NFT on secure transaction ledger 306.

Once the transfers are complete, respective collector containers 310g and 310h disconnect so that neither of collector containers is persistently paired with personal communication device 340. In some implementations, activating the pairing process may require proximity, and collector containers 310g and 310h may be configured to display their pairing status on their respective displays to ensure someone cannot trade or sell a collector container while it is paired with a personal communication device like personal communication device 340. Moreover, in some implementations collector containers 310g and 310h may be configured to display a warning message or otherwise provide an alert when another device, such as personal communication device 340 of user 308, a personal communication device of another user, or another collector container, for example, is paired or attempting to pair with collector container 310g or 310h.

Alternatively, or in addition, in some implementations user 308 may utilize personal communication device 340 to obtain an NFT for a digital asset available from NFT asset source 301 via communication network 302 and network communication links 304, and to transfer that NFT from the digital wallet on personal communication device 340 to one of collector containers 310g or 310h via one of wireless communication links 352 or wired connection device 119. However, it is noted that it is not necessary for personal communication device 340 to be in communication with collector containers 310g or 310h to send an NFT to either collector container. Instead, user 308 may utilize personal communication device 340 to use the destination ID of the collector container to which the NFT is to be assigned and communicate that destination ID and the NFT assignment to secure transaction ledger 306 via communication network 302 and network communication links 304. In that use case, the next time the collector container to which the NFT has been assigned synchronizes to secure transaction ledger 306, it will discover a new NFT it owns, and may download the associated NFT asset.

Figure 4A:
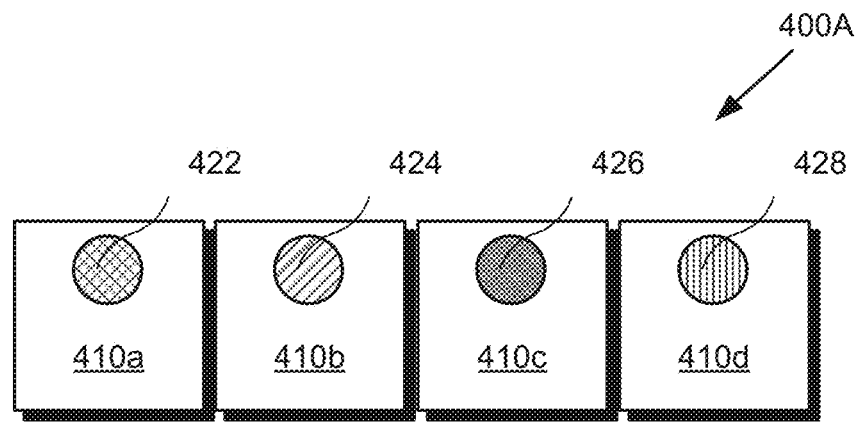
FIG. 4A shows a plurality of collector containers communicatively so as to synchronize display of the respective NFT asset each collector container stores, according to one implementation.

FIG. 4A shows diagram 400A of a plurality of collector containers communicatively coupled so as to synchronize display of the respective NFT asset each collector container stores, according to one implementation. FIG. 4A shows collector containers 410a. 410b, 410c, and 410d (hereinafter "collector containers 410a-410d") storing respective NFT assets 422, 424, 426, and 428. It is noted that each of collector containers 410a-410d corresponds in general to collector container 110, in FIGS. 1A and 1B. Consequently, each of collector containers 410a-410d may share any of the characteristics attributed to collector container 110 by the present disclosure, and vice versa. In addition. NFT assets 422, 424, 426, and 428 correspond respectively in general to NFT assets 122/222, 124/224, 226, and 228 shown variously in Figures IA. 1B, and 2. Thus. NFT assets 422, 424, 426, and 428 may share any of the characteristics attributed to respective NFT assets 122/222, 124/224, 226, and 228 by the present disclosure, and vice versa.

According to the exemplary use case shown in FIG. 4A, collector containers 410a-410d are interactively coupled so as to synchronize the display of respective NFT assets 422, 424, 426, and 428 by each of respective collector containers 410a-410d. In some implementations, collector containers 410a-410d may be wirelessly coupled using wireless communication unit 117 of each of collector containers 410a-410. In other implementations, collector containers 410a-410d may be interactively coupled using wired connection device 119 of each of collector containers 410a-410. In yet other implementations, collector containers 410a-410d may be interactively coupled using a combination of wired and wireless connections.

For example, collector container 410a may be interactively coupled with collector container 410b using wired connection device 119, and may be in wireless communication with one or more of collector containers 410c and 410d. Analogously, collector container 410b may be interactively coupled with collector containers 410a and 410c using wired connection device 119, and may be in wireless communication with collector container 410d.

Figure 4B:
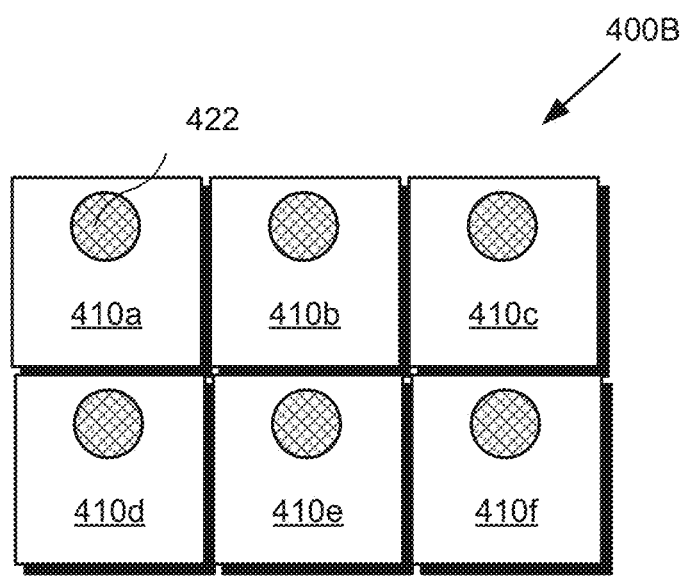
FIG. 4B shows a plurality of collector containers communicatively so as to synchronize display of the same NFT asset, according to one implementation.

FIG. 4B shows diagram 400B of collector containers 410a-410d communicatively coupled so as to synchronize display of the same NFT asset, i.e., NFT asset 422, according to one implementation. It is noted that any feature in FIG. 4B identified by a reference number identical to that shown in FIG. 4A corresponds in general to that previously identified feature, and those corresponding features may share any of the characteristics attributed to either corresponding feature by the present disclosure.

In various use cases, the display configuration shown by diagram 400B may be used to sequentially or concurrently display distinct instantiations of NFT asset 422 by one or more of collector containers 410a-410d. Alternatively, in some use cases, collector containers 410a-410d may be synchronized so as to display a larger image of NFT asset 422 than any single collector container would be capable of displaying alone.

Thus, present application discloses collector container devices configured to store and display NFT assets, as well as to uniquely store the NFTs certifying ownership of the NFT assets. The collector container devices disclosed herein advance the state-of-the-art by providing its owner with a novel and unique opportunity to own, physically possess, and physically display a limited edition right to a digital collectable. Using NFT technology and a secure transaction ledger, the collector container devices disclosed by the present application can advantageously be used to certify authenticity of the limited release and the validation of ownership.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A collector container comprising:
   a power source;
   a processing hardware; and
   an output device comprising at least one of a speaker or a display screen; and
   a memory storing a digital wallet;
   wherein the collector container is configured to:
      uniquely store a non-fungible token (NFT) in the digital wallet, the NFT certifying ownership of a first NFT asset stored in the memory;
      uniquely store, in the memory, NFT credentials including all of one or more keys certifying ownership of the first NFT asset, such that only the collector container stores all of the one or more keys including any and all private and public keys;
      store the first NFT asset in the memory, wherein the first NFT asset includes a first digital file containing at least one of a first image, a first audio, or a first video;
      communicatively couple the collector container with another collector container including a second NFT asset having a second digital file containing at least one of a second image, a second audio, or a second video; and
      sequentially or concurrently perform at least one of displaying the first image, playing the first audio, or playing the first video, using the output device in synchronization with the another collector container that is communicatively coupled to the collector container and performing the at least one of displaying the second image, playing the second audio, or playing the second video;
      wherein the collector container is a physical device, and wherein uniquely storing all of the one or more keys certifying ownership of the first NFT asset in the memory of the collector container results in physical possession of the collector container uniquely determining ownership of the NFT.

2. The collector container of claim 1, wherein the output device comprises the display screen, and wherein when the first NFT asset displayed or played on the display screen is transferred to another digital wallet and the first NFT asset is relinquished by the collector container, the display screen becomes blank.

3. The collector container of claim 1, wherein a shape of the collector container comprises one of a shape of an animated character, a building, a letter, a word, or a logo.

4. The collector container of claim 1, wherein the collector container is a wearable button, pin, or watch.

5. The collector container of claim 1, further comprising a wireless communication unit, wherein the collector container is further configured to:
   obtain, using the wireless communication unit, the NFT; and
   receive, using the wireless communication unit, the first NFT asset.

6. The collector container of claim 1, further comprising a wireless communication unit, wherein the collector container is further configured to:
   transfer, using the wireless communication unit, the NFT to another digital wallet stored in a second collector container;
   relinquish the first NFT asset to the second collector container; and
   record the transfer of the NFT to the another digital wallet on a cloud-based secure transaction ledger.

7. The collector container of claim 6, wherein the wireless communication unit comprises a Near Field Communication (NFC) device, and wherein the NFT is transferred to the another digital wallet stored in the second collector container using the NFC.

8. The collector container of claim 1, further comprising a wired connection configured to couple the collector container to the another collector container.

9. The collector container of claim 1, wherein the first digital file contains the first image and the second digital file contains the second image, and wherein the collector container and the another collector container are synchronized to concurrently display a larger image that is a combination of the first image and the second image.

10. A collector container comprising:
    a power source;
    a processing hardware;
    an output device comprising at least one of a speaker or a display screen;
    a wireless communication unit; and
    a memory storing a software code and a digital wallet;
    the processing hardware configured to execute the software code to:
       obtain, using the wireless communication unit, a non-fungible token (NFT) certifying ownership of a first NFT asset;
       receive, based on the NFT, the first NFT asset, wherein the first NFT asset includes a digital file containing at least one of a first image, a first audio, or a first video;
       uniquely store the NFT in the digital wallet;
       store the first NFT asset in the memory;
       uniquely store, in the memory, NFT credentials including all of one or more keys certifying ownership of the first NFT asset, such that only the collector container stores all of the one or more keys including any and all private and public keys;
       communicatively couple the collector container with another collector container including a second NFT asset having a second digital file containing at least one of a second image, a second audio, or a second video; and
       sequentially or concurrently perform at least one of displaying the first image, playing the first audio, or playing the first video, using the output device in synchronization with the another collector container that is communicatively coupled to the collector container and performing the at least one of displaying the second image, playing the second audio, or playing the second video;
       wherein the collector container is a physical device, and wherein uniquely storing all of the one or more keys securing the NFT in the memory of the collector container results in physical possession of the collector container uniquely determining ownership of the NFT.

11. The collector container of claim 10, wherein a shape of the collector container comprises one of a shape of an animated character, a building, a letter, a word, or a logo.

12. The collector container of claim 10, wherein the collector container is a wearable button, pin, or watch.

13. The collector container of claim 10, wherein the processing hardware is further configured to execute the software code to:
   transfer, using the wireless communication unit, the NFT to another digital wallet stored in a second collector container;
   relinquish the first NFT asset to the second collector container; and
   record the transfer of the NFT to the another digital wallet on a cloud-based secure transaction ledger.

14. The collector container of claim 10, further comprising a wired connection configured to couple the collector container to the another collector container.

15. The collector container of claim 1, wherein the processing hardware is further configured to executed the software code to:
   uniquely store a second NFT in the digital wallet, the second NFT certifying ownership of a second NFT asset;
   uniquely store, in the memory, all of one or more second keys securing the second NFT; and
   store the second NFT asset in the memory.

16. The collector container of claim 10, wherein the collector container is further configured to:
   uniquely store a second NFT in the digital wallet, the second NFT certifying ownership of a second NFT asset;
   uniquely store, in the memory, all of one or more second keys securing the second NFT; and
   store the second NFT asset in the memory.

17. The collector container of claim 10, wherein the first digital file contains the first image and the second digital file contains the second image, and wherein the collector container and the another collector container are synchronized to concurrently display a larger image that is a combination of the first image and the second image.

* * * * *